United States Patent [19]

Yashuhara

[11] Patent Number: 4,896,991
[45] Date of Patent: Jan. 30, 1990

[54] JOINING STRUCTURE FOR FRAMES USED IN BICYCLES AND SIMILAR VEHICLES

[75] Inventor: Masanori Yashuhara, Osaka, Japan

[73] Assignee: Kabushiki Kaisha Fukurotani Seisakusho, Osaka, Japan

[21] Appl. No.: 319,815

[22] Filed: Mar. 3, 1989

Related U.S. Application Data

[63] Continuation-in-part of Ser. No. 176,082, Mar. 31, 1988, abandoned.

[30] Foreign Application Priority Data

Apr. 1, 1987 [JP] Japan .................................. 62-82145

[51] Int. Cl.⁴ ................................................ B25G 3/16
[52] U.S. Cl. .................................. 403/290; 285/402; 285/422; 285/915
[58] Field of Search ............... 403/290; 285/396, 402, 285/915, 174, 360, 361, 376, 401, 173, 174, 422

[56] References Cited

U.S. PATENT DOCUMENTS

| 7,318 | 8/1850 | Brown | 285/396 |
| 658,493 | 9/1900 | Trigwell | 403/290 X |
| 1,762,572 | 6/1930 | Davidson | 285/396 X |

Primary Examiner—Dave W. Arola
Attorney, Agent, or Firm—Koda & Androlia

[57] ABSTRACT

A joining structure for coupling and pipes in frames used in bicycles and similar vehicles including engaging projections formed on either connecting projections of the coupling or the pipe ends, and insertion cut-outs formed in the mating connecting extensions or pipe ends. After insertion, the mated parts are rotated until they are machanically locked in place by locking slots. Bonding agents may be used to increase the strength of the joints and/or intermediate parts can be used to securely join the connecting extensions and pipes by the use of locking slots and the application of bonding agents. The design provides overlapping in the joints between the intermediate parts and the pipes to increase the bonding surface area and thus the mechanical strength.

5 Claims, 5 Drawing Sheets

JOINING STRUCTURE FOR FRAMES USED IN BICYCLES AND SIMILAR VEHICLES

This is a continuation of application Ser. No. 176,082, filed Mar. 31, 1988, now abandoned.

BACKGROUND OF THE INVENTION

1. Field of the Invention

The present invention concerns a joining structure for frames, and more specifically a highly stable and secure joining structure for couplings and pipes in frames used in bicycles and similar vehicles.

2. Prior Art

Conventionally, frames used in bicycles and similar vehicles have been constructed by joining couplings and pipes, and then securely bonding the couplings and pipes together by welding or brazing.

With the spread of sport bicycles in recent years, however, efforts have been made to lighten the weight of bicycle bodies. As a result, frames have been constructed from aluminum alloys and various frames using new materials such as carbon fibers, etc., have been developed. In the case of such new materials, the melting point may be low (as in aluminum alloys), or heating may cause embrittlement or a change in color or shape so that the external appearance of the material deteriorates. In some cases, therefore, joining by welding or brazing is impossible. Accordingly, the couplings and pipes in such frames are joined together by means of a bonding agent. As a result, there has also been active research and development concerning bonding agents with high bonding strength.

In the case of a mere chemical adhesive force which depends on a bonding agent, there are problems in durability when the bicycle is loaded. As a consequence, the frame may break while the bicycle is being ridden, resulting in personal injury. Accordingly, the combined use of some other locking means in addition to the aforementioned bonding agent is desirable. Furthermore, in cases where only a bonding agent is used, the axial length of the connecting extensions of the couplings is short, so that the area coated with the aforementioned bonding agent is small. Accordingly, even if a strong bonding agent is used, some uncertainty remains regarding the bonding strength.

SUMMARY OF THE INVENTION

The present invention was designed in order to reduce the abovementioned drawbacks. The first part of the present invention is characterized by (a) connecting extensions which connect pipe ends, formed on at least one of the couplings which make up a frame, (b) engaging projections formed on the external circumferential surfaces of either the connecting extensions or the pipe end, (c) insertion cut-outs into which the engaging projections are inserted and which guide the engaging projections, formed in either the circumferential walls or internal circumferential surfaces of the mating connecting extensions or pipe ends, (d) locking slots oriented in the circumferential direction, formed as continuations of the insertion cut-outs, and (e) a system of securely joining connecting extensions and pipe ends by inserting the engaging projection on each of one of the connecting extensions or pipe ends into the insertion cut-out formed in each of the mating connecting extensions or pipe ends, and then rotating the respective parts relative to each other in the circumferential direction, so that the engaging projections are locked in place by the locking slots.

Furthermore, the second part of the present invention is characterized by the fact that the surface area of the joint between pipes and couplings is increased by (a) interposing intermediate parts between the couplings and pipes, (b) connecting the connecting extensions of the couplings with the ends of the intermediate parts by means of a structure similar to that of the first part, and (c) connecting the pipes with the intermediate parts using a bonding agent or similar means.

In the first part of the present invention, engaging projections are formed on either the connecting projections of the couplings or the pipe ends, and insertion cut-outs are formed in the mating connection extension or pipe ends. Accordingly, in assembly, the engaging projections are guided by the insertion cut-outs to simplify the procedure. When the respective parts are then rotated relative to each other in the circumferential direction, the engaging projections are mechanically locked in place by the locking slots, so that the mating parts will not separate from each other even if the couplings or pipes are pulled in a direction which would tend to cause them to come apart.

Furthermore, when the connecting extensions and pipe ends are joined together after coating the mutual contact surface of these parts with a bonding agent, the strength of the frame is greatly improved by the mechanical bonding force (due to the engaging projections and locking slots) which is added to the chemical adhesive force due to bonding agent. Accordingly, the safety of the bicycle, etc., can be greatly improved especially in the case of a light-weight bicycle.

Furthermore, when the bonding agent and joining structure of the present invention are used in combination, the bonding agent collects in the insertion cut-outs, so that the engaging projections are fixed firmly in place when the bonding agent solidifies. As a result, slipping between the parts is prevented, so that safety is increased even further.

In the second part of the invention, the intermediate parts are securely joined in the connecting extensions of the couplings mechanically by means of engagement between the engaging projections and locking slots in the same manner as in the first part, and the pipes are then joined to these intermediate parts. Accordingly, if the intermediate parts are first joined to the connecting extensions using a bonding agent, the intermediate parts can be securely joined to the couplings by the mutually reinforcing effect of the mechanical bonding force and chemical bonding force (based on the adhesive) as in the first part of the invention. Next, the pipes are joined to these intermediate part using a bonding agent. Since the axial length of the intermediate parts can be set arbitrarily, the surface area bonded by the bonding agent (between the intermediate parts and the pipes) can be increased by increasing the axial length. Thus, the chemical bonding force can be greatly increased, so that the joints between the couplings and pipes are greatly strengthened.

At the same time, the intermediate parts and/or pipes are caused to overlap the connecting extensions, which are relatively weak parts of the couplings, so that the mechanical strength is increased. Accordingly, an effect is created which is similar to the effect obtained using thick-walled pipes, so that the frame is sufficiently able to withstand concentrations of stress which occur when the frame is loaded. In this case, furthermore, the joint areas between the connection extensions and the intermediate parts are automatically covered by the pipes, so that a frame structure with a superior external appearance is obtained without any need for retouching.

DETAILED DESCRIPTION OF THE INVENTION

Appropriate embodiments of the present invention will be described below with reference to the accompanying drawings.

Figure 2:
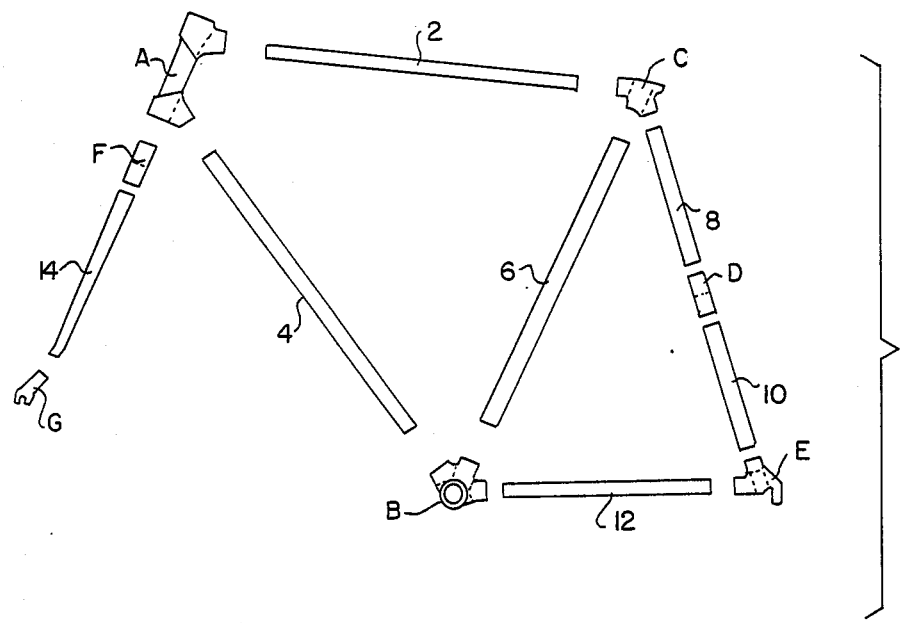
FIG. 2 is an exploded view of the bicycle frame.

FIG. 2 is an exploded view of a bicycle frame to which the present invention is applied. The frame couplings include a head lug A, a hanger lug B. a seat lug C, a back bridge D, a rear end E, a fork crown F and a front end G. The frame pipes include an upper pipe 2, a lower pipe 4, an upright pipe 6, a first back fork 8, a second back fork 10, a chain stay 12, a front fork leg 14 and a fork stem (not shown in the figures) which is inserted into the head lug A. The present invention concerns a joining structure for joining at least one of the coupling making up the abovementioned frame with the pipes which are connected to the couplings.

Figure 1:
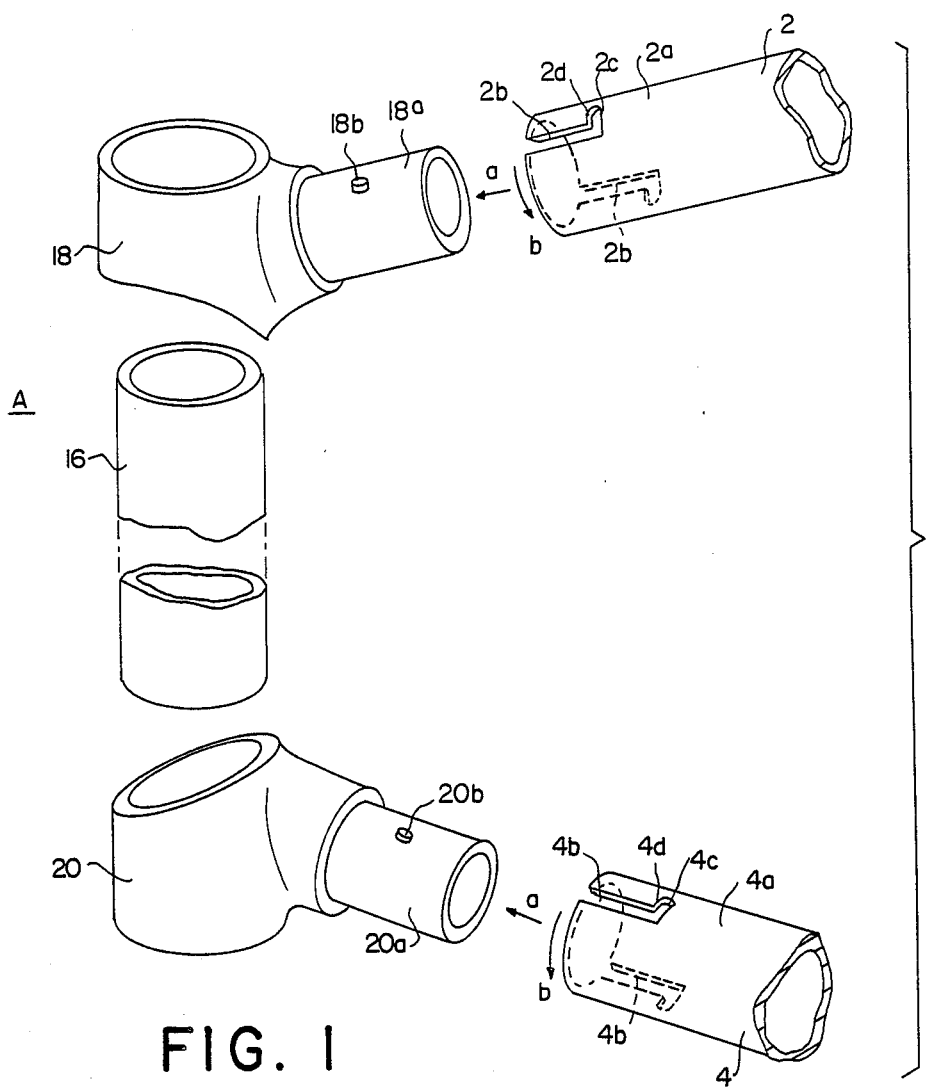
FIG. 1 is an oblique view illustrating an embodiment in which the present invention is applied to a bicycle head lug.

FIG. 1 is an oblique view which illustrates the method used to join the head lug A with the upper pipe 2 and lower pipe 4. This is shown as one example of the present invention. The head lug A includes a head tube 16, an upper lug 18 and a lower lug 20 which are bonded to the upper and lower ends of the head tube 16, respectively, by means of a bonding agent. Of course, a one-piece lug could also be used in the present invention instead of such a divided lug. Connection extensions 18a and 20a, which are connected to the pipe ends 2a and 4a, of the upper and lower pipes 2 and 4 are provided on the upper and lower lugs 18 and 20. Engaging projections 18b and 20b are formed on the external circumferential surfaces of these connecting extensions 18a and 20a. Although not shown in the figures, a pair of engaging projections may be formed on each of the connecting extensions. Of course, the number of engaging projections formed may be varied in accordance with bonding strength requirements, forming conditions, etc. Furthermore, various universally known forming techniques such as casting, pressing, etc. may be used to form these engaging projections.

A pair of insertion cut-outs 2b and 4b and a pair of cut-out slots 2c and 4c, each of which is oriented in the circumferential direction as a continuation of the corresponding insertion cut-out are formed in each of the pipe ends, i.e., upper pipe end 2a and lower pipe end 4a. The forward edges of these cut-out slots 2c and 4c act as locking parts 2d and 4d. In order to connect the connecting extensions 18a and 20a to the upper and lower pipe ends 2a and 4a, the external circumferential surfaces of the connecting extensions 18a and 20a and the internal circumferential surfaces of the pipe ends 2a and 4a are first coated with a bonding agent. Next, the upper and lower pipe ends 2a and 4a are advanced in the direction indicated by arrow a and fitted over the connecting extensions 18a and 20a so that the engaging projections 18b and 20b enter the insertion cut-outs 2b and 4b. Afterward, when the upper and lower pipes 2 and 4 are rotated in the direction indicated by arrow b, the engaging projections 18b and 20b enter the cut-out slots 2c and 4c, the pipes continue to rotate until these projections 18b and 20b strike the innermost ends of the slots 2c and 4c.

Figure 3:
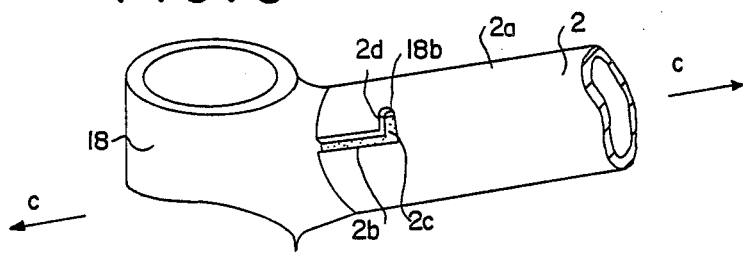
FIG. 3 is an oblique view of the upper lug portion of the head lug.

As a result the upper lug 18 and the upper pipe 2 are joined as shown in FIG. 3. Accordingly, even if the upper lug 18 and the upper pipe 2 are pulled apart in the directions indicated by arrows c, the engaging projection 18b and locking part 2d check each other so that both parts (upper lug 18 and upper pipe 2) are mechanically locked in place. The same is true in the case of the lower lug 20 and lower pipe 4. Furthermore, since the bonding agent pools in the insertion cut-out 2b and cut-out slot 2c, a flat surface is obtained when the bonding agent solidifies, and the engaging projection 18b is locked into the cut-out slot 2c by the solidified bonding agent, so that an extremely strong joint is obtained. Thus, as a result of the mutually reinforcing effect of the chemical bonding force based on the bonding agent and the mechanical bonding force, the present invention is especially effective when applied to lightweight bicycles and similar frame structure.

FIGS. 4 through 7 illustrate another embodiment of the present invention. In this embodiment, the engaing projections are formed on the pipes instead of on the connecting extensions as in the first embodiment.

Figure 6:
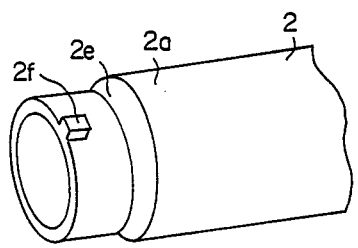
FIG. 6 is an oblique view of one of the pipe ends.

In FIG. 6, the diameter of the pipe end 2a of the upper pipe 2 is reduced via a step 2e, and an engaging projection 2f is formed on the external circumferential surface at the tip of the pipe end. The circumferential surface of the upper pipe 2 and the top surface of the engaging projection 2f are formed so that they are in the same plane. Of course, it would also be possible to make the top surface of the engaging projection 2f lower, as long as this causes no problems in terms of bonding strength.

Figure 4:
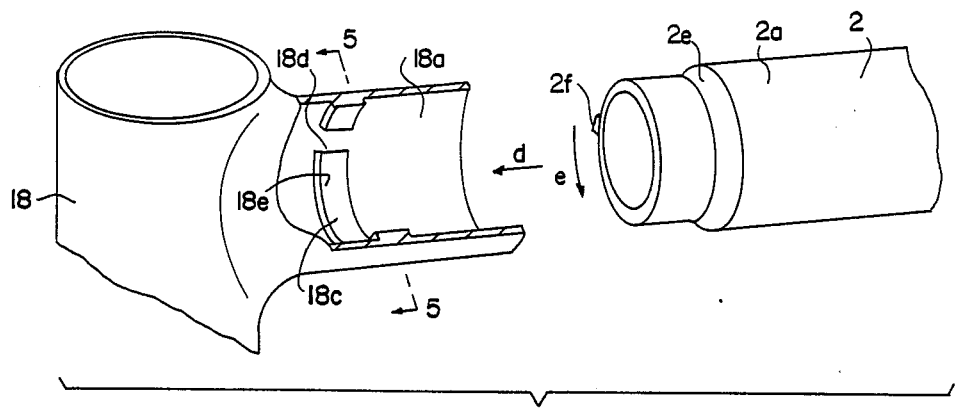
FIG. 4 is an oblique view of another embodiment of this invention.
Figure 5:
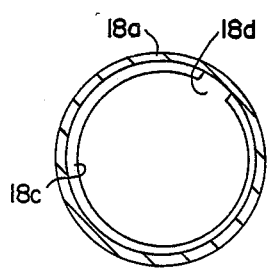
FIG. 5 is a cross-sectional view along line 5—5 of FIG. 4.

FIG. 4 shows a ring-form projection 18c formed on the interior circumferential surface of the connecting extensions 18a of the upper lug 18. An insertion cut-out 18d is formed in an axial direction on this ring-form projection. FIG. 5, which is a cross-sectional view along the line 4-4 in FIG. 4, shows this structure clearly.

As seen from FIG. 4, the pipe end 2a is first inserted into the connecting extension 18a in the direction indicated by the arrow d. After the engaging projection 2f passes through the insertion cut-out 18d, joining is completed by rotating the upper pipe 2 in the direction indicated by the arrow e.

Figure 7:
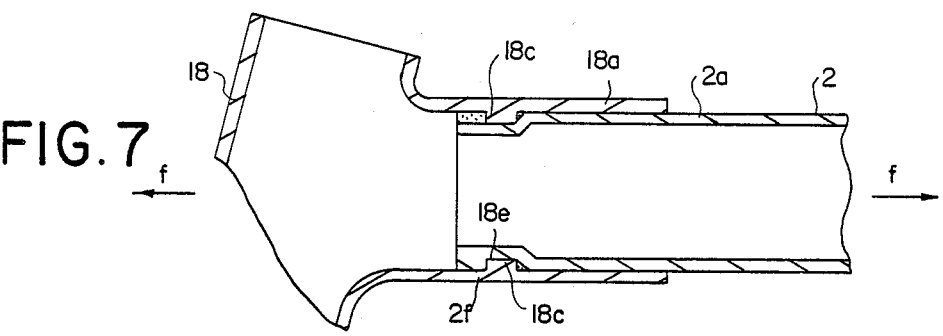
FIG. 7 is a longitudinal sectional view of the joint following connection.

As a result, as seen from FIG. 7, the rim of the ring-form projection 18c acts as a locking part 18e. Accordingly, since the engaging projection 2f is checked by this locking part 18e, the upper lug 18 and the upper pipe 2 will not separate from each other even if the two parts should be pulled apart in the directions indicated by arrows f. Furthermore, if a bonding agent is used in combination with this structure, the gap between the two parts will be filled by the bonding agent as indicated by the dotted area, and any rotation of the upper pipe 2 will be prevented by the solidification of the bonding agent. Accordingly, an extremely stable frame is provided, with no danger of separation of the parts.

Although not shown in the figures, the scope of the present invention includes a structure in which cut-outs similar to the insertion cut-outs 2d and cut-out slots 2c formed in the upper and lower pipes 2 and 4 in FIG. 1 are formed in the connecting extension 18a instead of the ring-form projection 18c shown in FIG. 4. In this case, the engaging projection 2f would be caused to engage with these cut-outs. If the parts are designed so that the circumferential surfaces of the connecting extension 18 and engaging projection 2f are in the same plane after engagement, the frame can be finished to an extremely attractive general appearance by filling the remaining gap with bonding agent.

Also covered by the scope of the present invention is the structure with a ring-form projection 18c, such as that shown in FIG. 4, formed on the internal circumferential surface of each of the upper and lower pipe end 2a and 4a to obtain an effect similar to that shown in FIG. 4 with engaging projections 18b and 20b such as those shown in FIG. 1.

Figure 8:
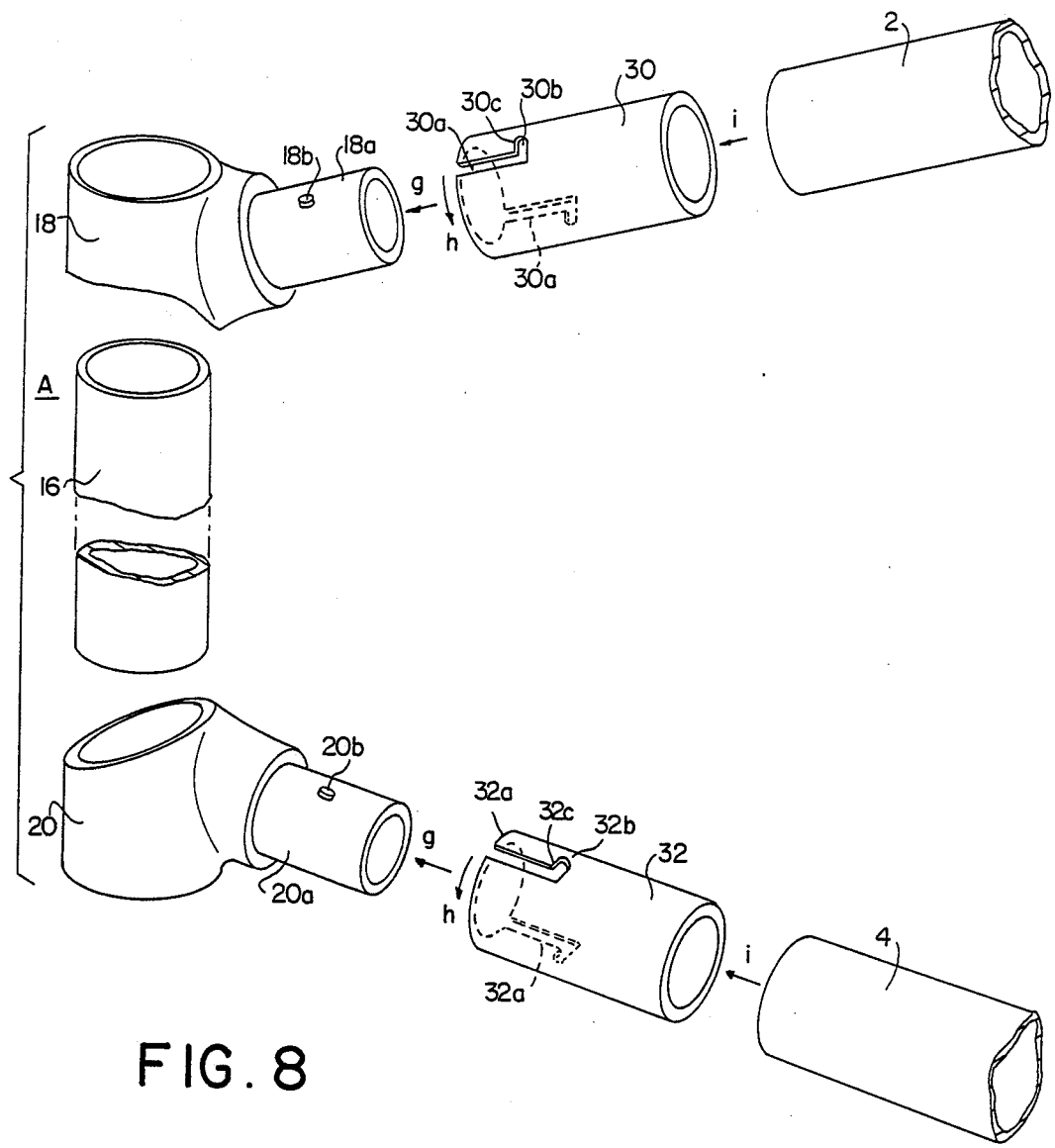
FIG. 8 is an oblique view which illustrates an embodiment of the second part of the present invention.

FIGS. 8 through 20 illustrate an embodiment of the second part of the present invention. In FIG. 8, the head lug A is the same as that shown in FIG. 1; accordingly, this head lug is not described in detail here. Intermediate parts 30 and 32 are interposed between the connecting extensions 18a and 20a and upper pipe 2 and lower pipe 4, respectively. Circumferentially oriented cut-out slots 30b and 32b are formed in the intermediate parts 30 and 32 in the same manner as in FIG. 1. The forward edges of these cut-out slots 30b and 32b act as locking parts 30c and 32c.

In order to join the intermediate parts 30 and 32 to the connecting extensions 18a and 20a, the contact surfaces of the respective parts are first coated with a bonding agent. Next, the intermediate parts 30 and 32 are slipped over the connecting extensions in the same manner as in FIG. 1 (as indicated by arrows g in FIG. 8). Further, when the intermediate parts 30 and 32 are rotated as indicated by arrows h in FIG. 8, the engaging projections 18b and 20b are fixed in place by the locking parts 30c and 32c (after having passed through the insertion cut-outs 30a and 32a) and cut-outs slots 30b and 32b. The effect is similar to that obtained in the embodiment shown in FIG. 1, and is therefore not described here.

As seen in FIG. 8, the axial lengths of the intermediate parts 30 and 32 are set so that they are considerably longer than the lengths of the connecting extensions 18a and 20a. If bonding agent is applied the external circumferential surfaces of these intermediate parts 30 and 32 and the internal circumferential surfaces of the upper and lower pipes, and the upper and lower pipes 2 and 4 are then fitted over the intermediate parts 30 and 32 as indicated by arrows i, an extremely strong bonding force is obtained, since the area of contact between the respective parts is large. Furthermore, the external circumference surfaces of the intermediate parts may also be subjected to a surface treatment (roughening treatment, working with a knurling tool, formation of bonding agent reservoirs, etc.) in order to strengthen the adhesive effect.

Figure 9:
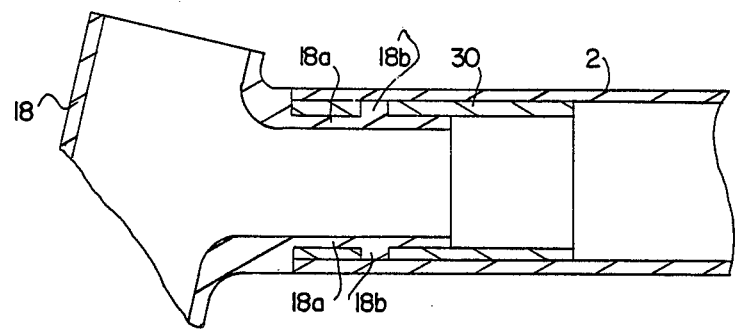
FIG. 9 is a longitudinal cross-sectional view of the essential parts of FIG. 8.

As seen from FIG. 9, the intermediate part 30 and upper pipe 2 overlap with the relatively thin connecting extension 18a to increase the mechanical strength of this portion of the frame. Thus, the frame is sufficiently reinforced against stress concentrations which may occur when the frame is loaded. Furthermore, since the axial lengths of the intermediate parts 30 and 32 can be set as desired, the intermediate parts have various technical merits, e.g. they allow the bonding strength to be varied in accordance with the type of bicycle or other equipment involved.

Figure 10:
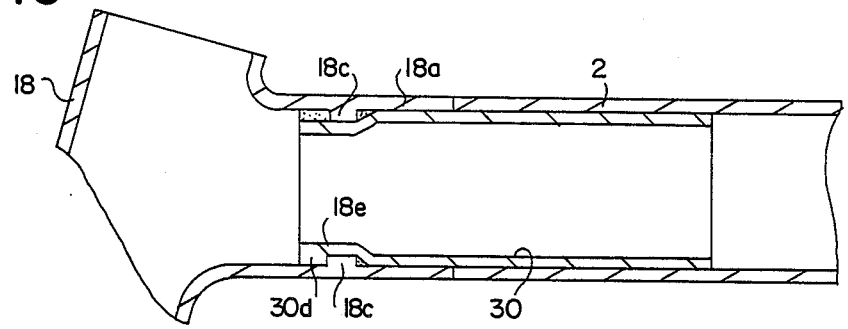
FIG. 10 is a longitudinal sectional view of another embodiment of the second part of the present invention.

FIG. 10 shows another embodiment of the aforementioned second part of the invention. Here, the shape of the end of the intermediate part 30 is the same as in FIG. 6, with an engaging projection 30d being formed. The procedure by which this intermediate part 30 is inserted into the connecting extension 18 and anchored by the locking part 18e of the ring-form projection 18c is exactly the same as in FIG. 4. Next, the external circumferential surface of the intermediate part 30 (which protrudes from the connecting extension 18a) and the internal circumferential surface of the upper pipe 2 are coated with a bonding agent, and the two parts are connected by slipping the upper pipe 2 over the intermediate part 30. If the exposed surface area of the intermediate part 30 is large, i.e., if the axial length of the intermediate part 30 is long, then the area of bonding with the pipe is increased so that the bonding strength is greatly improved. since the axial length of the intermediate part 30 can be freely adjusted, the bonding strength can also be freely adjusted merely by replacing the intermediate part with one of a different length.

The structures of the insertion cut-outs and locking parts, and the shape of the engaging projections, etc., can be optimally designed on a case by case basis. In this and other regards, the present invention is not limited to the embodiments described above. Various other modifications and design changes are included within the scope of the present invention, as long as there is no departure from the technical spirit of the present invention.

In the first part of the present invention, as was described above, engaging projections are formed on the external circumferential surfaces of either the connection extensions of the couplings or the pipe ends. Furthermore, locking parts are formed (via insertion cut-outs) on the mating parts (connecting extensions or pipe ends). Accordingly, the engaging projections are locked in place by the locking parts, so that the connection between the couplings and pipes is mechanically reinforced. Further-more, when a bonding agent is used in combination with this structure, the bonding agent flows into any gaps (insertion cut-outs, etc.) where it solidifies, thus preventing any movement of the engaging projections. Therefore, a great improvement in the bonding strength of light-weight bicycles, etc., can be achieved.

Furthermore, in the second part of the present invention, intermediate parts, whose axial length can be arbitrarily set, are srongly bonded to the connecting extensions in the same manner as in the first part of the invention, and the pipes are bonded to these large-area intermediate parts by means of a bonding agent. Accoringly, the bonding strength is greatly improved as a result of an increase in the bonding surface area. Thus, like the first part of the invention, this second part of the invention also has great merit for light-weight bicycles.

In addition, the bonding agent may be thermal setting adhesives such epoxy resin and phenol resin, theremoplastic adhesives such as acrylic resin and vinyl resin or a synthetic gum. Furthermore, the lightweight materials for the couplings may include aluminum, magnesium, titanium, alloys or ceramic compositions of aluminum, magnesium or titanium, carbon fibers and composites of any of these lightweight material. In addition, the lightweight material for the pipes and intermediate parts may include aluminum, magnesium, titanium, alloys or ceramic compositions of aluminum, magnesium or titanium, carbon fibers and composites of any of these lightweight materials.

I claim:

1. A joining structure for the lightweight frames of bicycles and similar vehicles formed by joining chemically and mechanically pipes and couplings, said joining structure comprising:
   pipes and couplings and connecting extensions formed on at least one of said couplings made from a lightweight material selected from the group consisting of aluminum, magnesium, titanium, alloys or ceramic compositions of aluminum, magnesium or titanium, carbon fibers and composites thereof;
   pipe ends formed at the extremities of said pipes made from a lightweight material selected from the group consisting of aluminum, magnesium, titanium, alloys or ceramic compositions of aluminum, magnesium or titanium, carbon fibers and composites thereof;
   engaging projections formed on the external circumferential surfaces of at least one of said connection extensions or said pipe ends;
   insertion cut-outs formed in at least one of the circumferential walls or internal cirumferential surfaces of the mating connecting extensions or pipe ends into which said engaging projections are inserted, the insertion cut-outs guiding said engaging projections;
   locking slots oriented in the circumferential direction formed as continuations of said insertion cut-outs, with said connection extensions and pipe ends securely joined to each other by inserting the engaging projection on each of one of said connecting extensions or pipe ends into the insertion cut-out formed in each of the other mating connecting extensions or pipe ends after coating bonding agents at the contact surface between said connecting extensions and pipe ends, and then rotating the mating connecting extension and pipe end relative to each other in the circumferential direction, so that the engaging projections are locked in place by the locking slots and slippage between said couplings and said pipes is prevented after bonding.

2. A joining structure for frames, according to claim 1, further comprising:
   said engaging projections formed on the external circumferential surfaces of said connecting extensions of said couplings;
   insertion cut-outs formed in the axial direction in the pipe ends; and
   locking slots formed in the circumferential direction in the pipe ends.

3. A joining structure according to claim 1, further comprising:
   said engaging projections formed on the external circumferential surfaces of said pipe ends;
   ring-form projections formed on the internal circumferential surfaces of said connecting extensions of said coupling, rims of said ring-form projections acting as locking slots; and
   an insertion cut-out formed in an axial direction in each of said ring-form projections.

4. A joining structure for lightweight frames of bicycles and similar vehicles formed by joining chemically and mechanically pipes and couplings, comprising:
   pipes and couplings and intermediate parts interposed between said pipes and couplings where these members are made from a lightweight material selected from the group consisting of aluminum, magnesium, titanium, alloys or ceramic compositions of aluminum, magnesium or titanium, carbon fibers and composites thereof;
   connecting extensions which connect to the intermediate parts formed on at least one of said couplings;
   engaging projections formed on the external circumferential surfaces of at least one of said connecting extensions or the ends of said intermediate parts;
   insertion cut-outs formed in at least one of said circumferential walls or internal circumferential surfaces of said other mating insertion cut-outs;
   connecting extensions or intermediate parts into which the engaging projections are inserted, the insertion cutouts guiding the engaging projections; and
   locking slots which are oriented in the circumferential direction formed as continuations of the insertion cut-outs, with said connecting extensions and intermediate parts securely joined to each other by inserting the engaging projection on each of one of said connecting extensions or intermediate parts into said insertion cut-out formed in each of the other mating connecting extensions or intermediate parts, after coating bonding agents at the contact surface between said connecting extensions and intermediate parts, and then rotating the mating connecting extension relative to each other in the circumferential direction, so that the engaging projections are locked in place by the locking slots, resulting in the joining of said couplings and said pipes by connecting the pipes to the intermediate parts by the bonding agents and the prevention of slippage between said couplings and said pipes after bonding.

5. A joining structure for lightweight frames according to claim 1, wherein said bonding agent is selected from the group consisting of thermal setting adhesives, thermoplastic adhesives and synthetic gums.

* * * * *

UNITED STATES PATENT AND TRADEMARK OFFICE
CERTIFICATE OF CORRECTION

PATENT NO. : 4,896,991
DATED : January 30, 1990
INVENTOR(S) : MASANORI YASUHARA

It is certified that error appears in the above-identified patent and that said Letters Patent is hereby corrected as shown below:

Column [75] Inventor: Change "Masanori Yashuhara, Osaka, Japan" to --Masanori Yasuhara, Osaka, Japan--

Item [19]: "Yashuhara" should read --Yasuhara--

Signed and Sealed this

Eighth Day of January, 1991

Attest:

HARRY F. MANBECK, JR.

*Attesting Officer*  *Commissioner of Patents and Trademarks*